US008368964B2

(12) United States Patent
Xu et al.

(10) Patent No.: US 8,368,964 B2
(45) Date of Patent: Feb. 5, 2013

(54) METHOD FOR ESTIMATION OF IMAGE DEFOCUS AND DEFOCUS RESTORATION

(75) Inventors: Beilei Xu, Penfield, NY (US); Robert Paul Loce, Webster, NY (US); Chu-Heng Liu, Penfield, NY (US); Ying-wei Lin, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 818 days.

(21) Appl. No.: 12/536,967

(22) Filed: Aug. 6, 2009

(65) Prior Publication Data

US 2011/0032575 A1 Feb. 10, 2011

(51) Int. Cl.
*H04N 1/40* (2006.01)

(52) U.S. Cl. ...................... 358/3.27; 358/474

(58) Field of Classification Search .............. 358/1.9, 358/2.1, 3.27, 496–497, 400, 500, 504–506, 358/406, 474, 493–494
See application file for complete search history.

(56) References Cited

U.S. PATENT DOCUMENTS

| 4,990,947 | A | * | 2/1991 | Komiya et al. | 396/101 |
|---|---|---|---|---|---|
| 6,763,141 | B2 | | 7/2004 | Xu et al. | |
| 6,806,980 | B2 | | 10/2004 | Xu et al. | |
| 7,170,644 | B2 | | 1/2007 | Loce et al. | |
| 2008/0130022 | A1 | | 6/2008 | Dalal | |
| 2010/0002950 | A1 | * | 1/2010 | Arieli et al. | 382/255 |

* cited by examiner

*Primary Examiner* — Thomas D Lee
*Assistant Examiner* — Stephen M Brinich
(74) *Attorney, Agent, or Firm* — Fay Sharpe LLP

(57) ABSTRACT

A method for determining local defocus distance in a scanned image of a non-planar original object is provided comprising scanning at least a portion of the non-planar original object to produce first scanned image data at a first focal plane and scanning same the at least a portion of the non-planar original object to produce at least second scanned image data at a second focal plane. The first scanned image data is different from the second scanned image data wherein a distance between the first focal plane and the second focal plane is a predetermined quantity. The method further comprises estimating an out-of-focus distance of the object from the first and the second scanned image data.

13 Claims, 10 Drawing Sheets

US 8,368,964 B2

METHOD FOR ESTIMATION OF IMAGE DEFOCUS AND DEFOCUS RESTORATION

BACKGROUND

Scanning a bound book, or other non-planar objects, using a conventional document scanner can result in three image quality defects: geometric distortion, illumination variation, and defocus. The present disclosure relates to the art of digital imaging. It finds particular application in conjunction with estimating local defocus distance and correcting defocus blur and geometric distortion in a scanned image of a bound book, and will be described with particular reference thereto. It is to be appreciated, however, that the disclosure will also find application in conjunction with correction of defocus blur and geometric distortions in other three-dimensional objects on a variety of image acquisition and output devices, such as scanners, xerographic copiers and printers.

Optical systems in document scanners and scanning copiers, such as a Selfoc® lens systems and conventional optical systems, possess a depth of field over which the optical system produces an image that meets resolution and distortion specifications. Conventionally, when a book or other bound, multi-page original is scanned by the scanner, the resulting digital image contains geometric distortions and blurring in the region adjacent the non-planar areas. In other words, portions of certain non-planar original objects, such as books, wrinkled sheets, and three-dimensional objects, may lie outside the depth of field of the imaging system. For these originals, the distance between the original object and the ideal object plane, e.g. the scanner platen surface, varies from point to point which may cause a spatially varying blur in the acquired image. In addition to blurring, geometric distortion and illumination falloff often occur due to the varying defocus distance across the original being scanned.

One solution to the above problem is to modify the platen to have a sloping edge portion whereby the bound portion of the book, or other original object, is placed in a corner position such that the entire surface of the page being copied is in close contact with the platen surface. This system suffers from a limited magnification range because of restriction on scanned component movement near the sloping corner edge. In addition, operability and production are limited by the inability to perform a "split scan," where both pages of a book are scanned without repositioning.

Another solution to the defocus blurring and geometric distortion problems employ an infrared distance sensor to determine the object defocus distance. In this method the plurality of sensed object defocus distances are used in a subsequent digital restoration algorithm. Another prior art technique uses one or more standard reference targets in order to determine the defocus or degraded states of specific scanner systems. The scanned image is then filtered with a fixed or time-varying image restoration filter, which utilizes correction coefficients pre-selected for the state of defocus or degradation. In addition, profile detectors have been inserted into the scanning system in order to measure the defocus distance of an object by using a reference image plane of the scanning system. The above techniques suffer from the disadvantage of additional required component costs as well as unwanted image processing complexity.

INCORPORATION BY REFERENCE

The following patents are incorporated by reference for their background; U.S. Pat. No. 6,763,141, U.S. Pat. No. 7,170,644, and U.S. Pat. No. 6,806,980, the disclosures of which are incorporated in their entirety herewith.

SUMMARY

In accordance with one aspect of the present disclosure, a method of determining local defocus distance in a scanned image of a non-planar original object is provided comprising scanning at least a portion of the non-planar original object to produce first scanned image data at a first focal plane and scanning same the at least a portion of the non-planar original object to produce at least second scanned image data at a second focal plane. The first scanned image data is different from the second scanned image data wherein a distance between the first focal plane and the second focal plane is a predetermined quantity. The method further comprises estimating an out-of-focus distance of the object from the first and the second scanned image data.

In accordance with another aspect of the present disclosure, a digital imaging method for imaging an open book having a book binding is provided comprising scanning the open book including a non-planar original object to produce first scanned image data at a first focal plane and scanning the open book including same the non-planar original object to produce at least second scanned image data at a second focal plane. The first scanned image data is different from the second scanned image data wherein a distance between the first focal plane and the second focal plane is a predetermined quantity. The method further comprises estimating an out-of-focus distance of the object from the first and the second scanned image data and determining local defocus distances at a plurality of pixel columns parallel to the book binding, wherein the defocus distance being determined from at least one image feature obtainable from the first scanned image data and the second scanned image data. And further, the method comprises restoring the first and/or the second scanned image data by deblurring the image data using inverse filtering.

In accordance with still another aspect of the present disclosure, a printing apparatus is provided for reproducing an image representation of a non-planar object, the apparatus comprises a planar imaging platen, a scanner for scanning the non-planar object placed on the platen to produce a first scanned image at a first focal plane and a second scanned image at a second focal plane. The first and the second scanned image data containing at least one of geometric distortions, blurring defects and illumination variations. The first scanned image data is different from the second scanned image data wherein a distance between the first focal plane and the second focal plane is a predetermined quantity. The apparatus further comprises a processor for calculating an out-of-focus distance of the object from the first and the second scanned image data, an image processor for determining local defocus distances at a plurality of pixel columns, wherein the defocus distance being determined from at least one image feature obtainable from one of the first scanned image data and the second scanned image data, and a digital processing station for restoring the first and the second scanned image data by deblurring the image data.

BRIEF DESCRIPTION OF THE DRAWINGS

The disclosure may take form in various components and arrangements of components, and in various methods. The drawings are only for purposes of illustrating embodiments and are not to be construed as limiting the disclosure.

DETAILED DESCRIPTION

Figure 1:
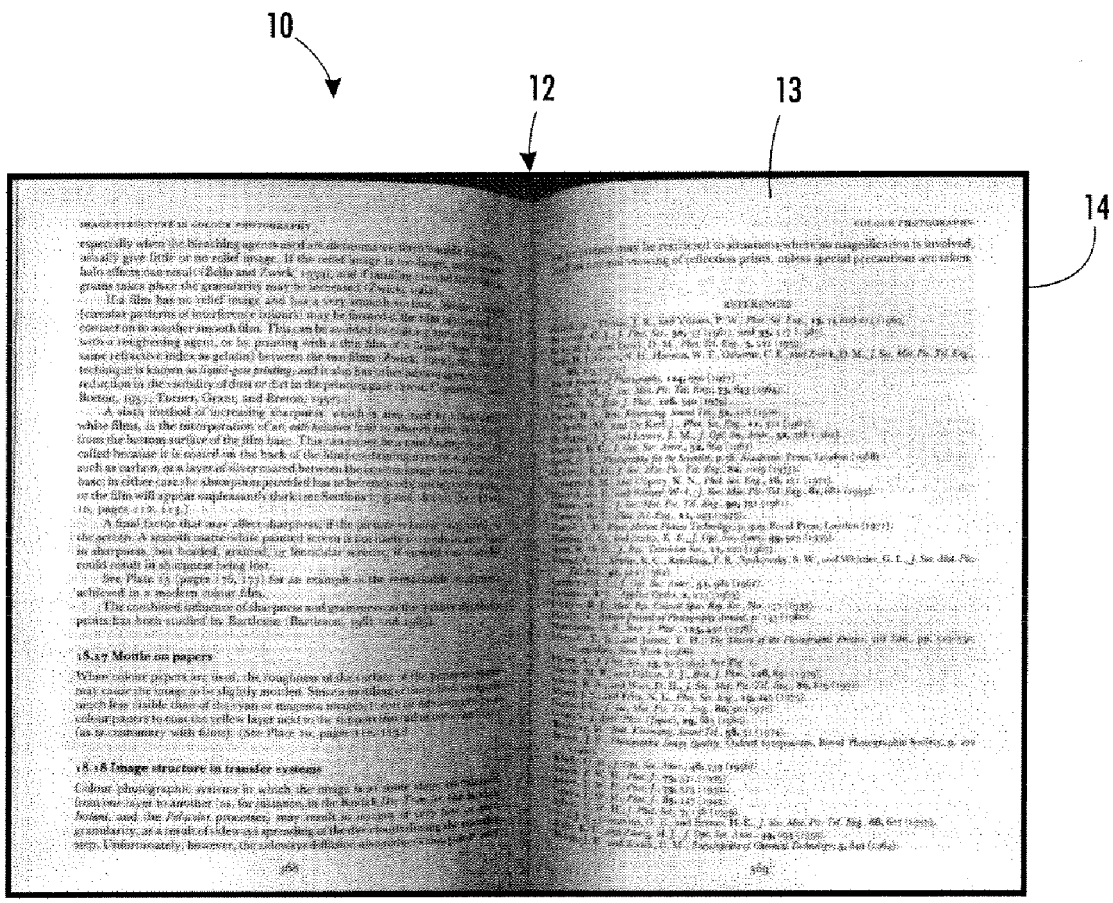
FIG. 1 is an illustration of a scanned image of an open book containing illumination variations adjacent the binding.

When an original document is scanned with a document scanner, and if it is not in close contact with the scanner surface, the scanned images can suffer from blurring caused by the optical defocus. This effect is particularly pronounced for Selfoc optical systems, which have a very short depth-of-focus (DOF). As shown in FIG. 1, a common defocus situation is the scanning of a bound book 10, where the binding 12 is raised off the platen. The amount of separation along the page 13 of a bound book and the platen varies from the binding 12, or inside edge, to the outside edge 14 of the page which results in spatially varying blur, illumination fall off, and geometric distortion.

When certain types of originals (e.g. books, wrinkled sheets, and 3D objects) are scanned, the out-of-focus distance varies from point-to-point due to the non-flatness of the original and the resulting blurring effect is non-uniform across the scanned image. Without knowledge of the out-of-focus distance for each location in the scanned image, a single conventional restoration filter can only be designed to cover a limited range of distances. Unfortunately, a single pre-selected restoration filter can result in over- or under-compensation of the blurring effect for portions of the restored image.

Figure 2:
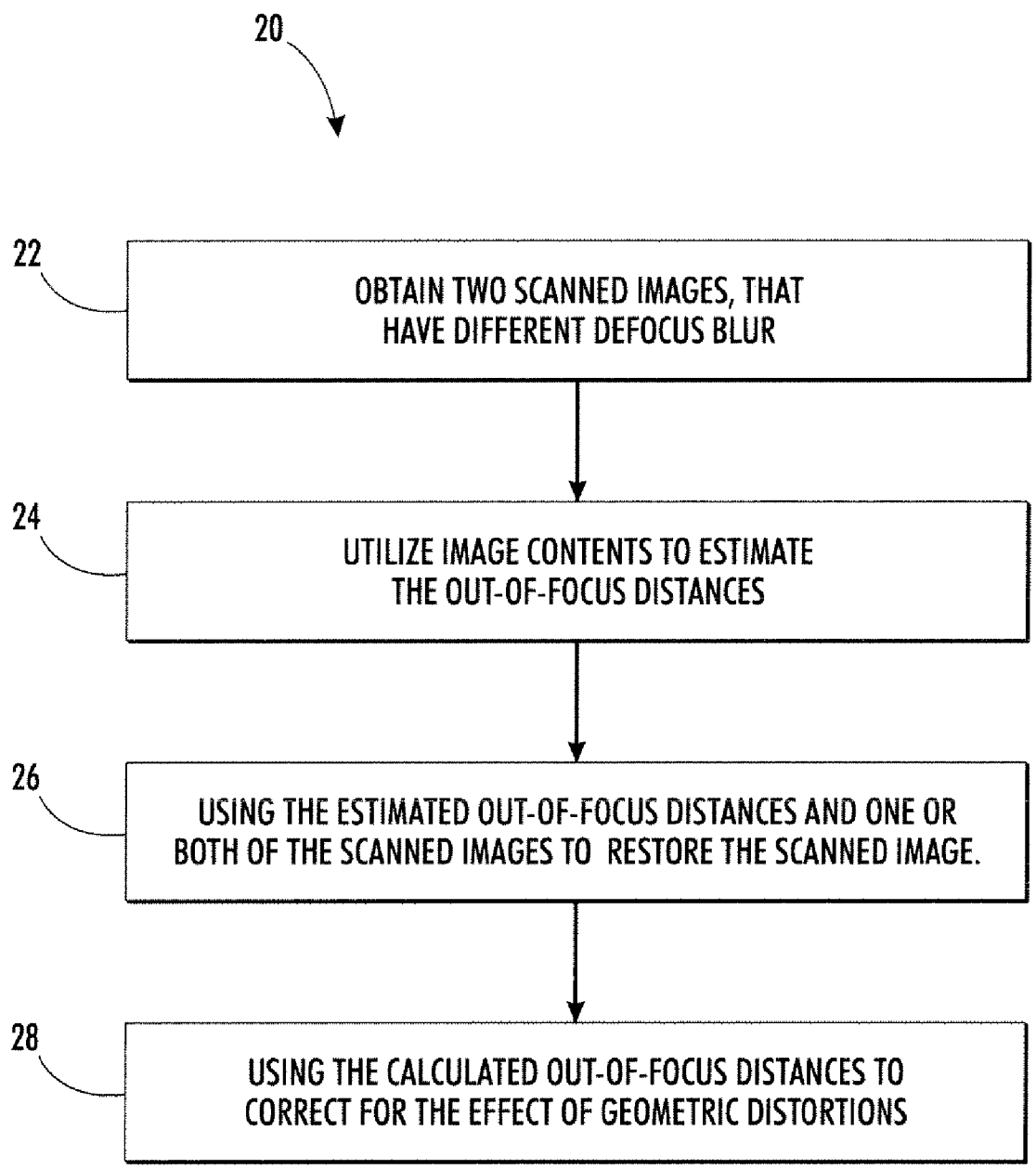
FIG. 2 are the generalized steps involved in the method of estimating defocus and defocus restoration.

With reference to FIG. 2, the generalized steps for estimating defocus and defocus restoration 20 are illustrated which determine local defocus distance in order to correct blurring and optionally geometric distortion caused by height non-uniformities in the original object 10 to be scanned. More particularly, the object 10, such as an open book or other bound material, having a binding 12, is placed in a face-down position on a flat scanning platen. The original object 10 is scanned in a conventional manner, producing electrical scanned image data, which is stored in an image data memory. While the present disclosure is being described in terms of an open-book scan, it is to be appreciated that it is applicable to scans of other three-dimensional objects having height variations which cause spatially varying blur and geometric distortion, such as pill bottles, coins, jewelry, and circuit boards.

Referring again to FIG. 2, the present disclosure provides the method 20 to estimate the defocus of a scanned image and a method to correct the defocus. The method can be applied to bound books and other non-planar objects positioned on a scanning platen. The method adaptively estimates the out-of-focus distances within a scanned image by using two versions, i.e. two scans 22, of the scanned image acquired at a known, predetermined, or measurable difference in optical path length between the two scans 24, or using the scanned image and a calibration scan of similar content (e.g., text) at a known defocus distance. If two scanned versions of the image are used, the optics can be defocused by a known amount for one of the scans. The difference in cut-off frequency between the scans can be used to estimate the defocus distance, which can be used in a filtering operation to restore the image to a sharp focus condition 26. In addition, the calculated out-of-focus distances can also be used in a geometric distortion correction algorithm 28 (to be described hereinafter).

To achieve optimal image quality, a restoration filter for non-flat documents should be spatially adaptive. Knowledge of the defocus distance for the various image regions is desirable for designing a suitable adaptive filter. In this disclosure, a method that estimates the out-of-focus distances within an image region based on two scans of the same or similar image content is described, where the two scans are taken at a known difference in defocus distance. Simulated experiments demonstrate that the proposed method can estimate the out-of-focus distance of an image based on the two scanned images, and restoration can be performed using the estimated out-of-focus distance.

In this disclosure, a further method is described that uses the two scanned images, which are blurred differently 22, to estimate the out-of-focus distances of various image regions of a scanned image 24. Steps involved in the process are shown in FIG. 2. Illustratively there are several methods described hereinafter of how to obtain two (or multiple) scanned images with the appropriate blur. In the estimation step, as an exemplary embodiment, a Fourier space approach is described for the case where the blurring effect can be modeled by a Gaussian function whose standard deviation is a linear function of the out-of-focus distance. An operator can then perform the desired restorations to the image region.

Referring again to FIG. 2, wherein one of the initial steps is to obtain two scanned images at different defocus blur 22. There are multiple ways a scanner can obtain two scanned images at two different optical depths. One method can use a similar image(s) scanned during a calibration step. In another method, two sets of sensors are employed at two different depths. Still other methods can use one set of sensors, wherein an original is scanned twice with each scan at a different object-to-sensor distance. Although one can use two scans for illustrative purposes, it is to be appreciated that more images, i.e. multiple scans, can be obtained in a similar manner, which can be used to reduce the uncertainties due to noise.

The differences in the Fourier spectra between two or more images can be used to determine a defocus distance. The Fourier method can use a measure of width of the spectrum rather than the details of the spectrum. Hence an image similar to the desired scanned image can be used to obtain an approximate spectrum at one or more fixed defocus distances. For example, consider the application of book scanning, wherein a great deal of book content is text (FIG. 1). A text image with a similar size font can be scanned using spacers to set specific defocus distances.

For the method wherein two sets of sensors are employed at two different depths, one set may be considered the primary set. One set of sensors can be positioned at a depth such that the focal plane is at the platen surface. This set of sensors can be used to obtain a scanned image at the designed scanner resolution. In addition to this set of sensors, another set is added that can be positioned with their focal planes offset in depth from the primary set. The focal planes can be on the object side of the platen surface. It is reasonable to assume that if the object is not in close contact with the platen surface, the object-to-surface distance will be approximately a few millimeters.

Hence, default depths can be preset in the manufacturing process such that the focal plane of the second set of sensors is a few millimeters above the platen surface. If a user expects the object-to-surface distance to be greater than the default, the user can employ controls within the scanner to adjust the focal plane of the second set of sensors accordingly. The second set of sensors can obtain the second image at the same or different resolution from the primary set. The second set might be at a lateral offset location from the primary axis from the lens, so the scanning apparatus will need to account for this distance to ensure that the desired image content is acquired.

A further exemplary method allows two scans at different focal distances wherein the two scans can be conducted with a single set of sensors at two physically different object-to-sensor distances. A user selects this feature when a book, a wrinkled original, or other 3D object is scanned. The scanner performs the two scans at two different depths. The distance between two focal planes can be a default, or predetermined quantity, that is set in the manufacturing process or a user may be given the option to select a distance. This single-set approach avoids the cost and design issues of installing a second set of sensors. However, a trade-off occurs because it will typically take a longer amount time to complete two full scans than one scan with two sets of sensors. In addition to compensating for the defocus, noise can be reduced in other portions of the image by averaging the scans. To reduce the scanning time, the second scan can optionally be performed at a reduced resolution or increased speed (shorter integrate time per pixel and use the two scans to reduce noise).

Another exemplary method can employ two scans with sensors at two optically different object-to-sensor distances. The optical object-to-sensor distance can be changed without moving the sensor or lens. For example, a piece of glass with high refraction index can be inserted between the lens array and the sensors after the first scan. By using a piece of glass, the focal plane of the second scan is moved. This approach avoids the mechanical process of accurately adjusting the two sensor positions. Furthermore, one can also use polarization properties of some glass to obtain two scanned images using one scan.

Using any of the aforementioned approaches, one can obtain two scanned images at two different depths or focal planes. It is to be appreciated that the scanner processes described above provide for the distance between the two focal planes to be set at a known quantity.

The out-of-focus distances of a scanned image can be estimated from the two or more scans 24 as described above in most practical situations. To be described hereinafter, various methods can be used to calculate the out-of-focus distances from these two scans. As an exemplary embodiment, a Fourier space approach is demonstrated below.

In the absence of noise, the two obtained images, $g_1(x)$ and $g_2(x)$, can be written as $$g_1(x)=f(x)*a_1(x), \qquad (1)$$

and $$g_2(x)=f(x)*a_2(x), \qquad (2)$$

where $f(x)$ represents the original image, * represents convolution, and $a_1(x)$ and $a_2(x)$ are the blurring functions, both of which depend on their respective out-of-focus distance. For Eqs. (1) and (2), one can assume that $a_1(x)$ and $a_2(x)$ are shift invariant with respect to x. More complicated cases, in which $a_1(x)$ and $a_2(x)$ vary with x, are discussed below. One can write $a_1$ and $a_2$ in a form that readily allows defocus distance to be estimated from Eqs. (1) and (2) as long as a few conditions are included (i.e., $g_1(x) \ne g_2(x)$).

As an exemplary embodiment, $$a_1(x)=b(x;h), \qquad (3)$$

and $$a_2(x)=b(x;h+\Delta h), \qquad (4)$$

where $b(x;h)$ and $b(x;h+\Delta h)$ are the blurring functions at the out-of-focus distances h and h+$\Delta$h, respectively. Note that, in this particular case, it is to be appreciated that $a_1(x)$ and $a_2(x)$ have the same functional form. Their corresponding Fourier transformations, $G_1(\xi)$ and $G_2(\xi)$, can be written as:

$$G_1(\xi)=F(\xi)B(\xi;h), \qquad (5)$$

and $$G_2(\xi)=F(\xi)B(\xi;h+\Delta h), \qquad (6)$$

where $F(\xi)$ and $B(\xi,h)$ are the Fourier transformations of $f(x)$ and $b(x; h)$, respectively.

The blurring function can be modeled as a Gaussian function, whose standard deviation is a linear function of the out-of-focus distances, $$b(x;h) = \frac{1}{\sqrt{2\pi}\,(h\sigma_0)} e^{\frac{-x^2}{2(h\sigma_0)^2}}, \qquad (7)$$

where $\sigma_0$ is a constant that provides the amount of spread (in x direction) per unit out-of-focus distance. It is to be appreciated that even in the best of focus, there is a blurring effect due to the optical blurring of the system. However, because it is independent of the out-of-focus distance of the original, it can be pre-calibrated and pre-compensated (or post-compensated) before compensating for the blurring effect due to the defocus.

Substitution of Eq. (7) into Eqs. (5) and (6) yields:

$$G_1(\xi) = F(\xi)\frac{1}{\sqrt{2\pi}} e^{-\xi^2(h\sigma_0)^2/2}, \qquad (8)$$

and $$G_2(\xi) = F(\xi)\frac{1}{\sqrt{2\pi}} e^{-\xi^2((h+\Delta h)\sigma_0)^2/2}. \qquad (9)$$

From Eqs. (8) and (9), one can show that:

$$h = \frac{\log_e(G_1(\xi)/G_2(\xi))}{\Delta h \xi^2 \sigma_0^2} - \frac{\Delta h}{2}. \qquad (10)$$

In the absence of noise, Eq. (10) shows that the out-of-focus distance can be estimated from the knowledge of the Fourier transformations of the two scanned images $G_1(\xi)$ and $G_2(\xi)$ (where the zeros of $B(\xi,h)$ and $B(\xi,\Delta h+h)$ do not coincide with each other). Due to the physical constraints of the problem, it is appreciated that h (or $\Delta$h) should be constant for all frequencies. However, in practice, because both $G_1$ and $G_2$ are band-limited, there will be no information available from $G_1$ and $G_2$ beyond a certain frequency point. That is, h cannot be reliably estimated beyond this frequency point. In addition, in the presence of noise, the information from the measured $G_1$ and $G_2$ can be dominated by noise at high frequencies, where the signal-to-noise ratio is low. Hence, more accurate estimates of h can come from the low frequency range where the signal-to-noise ratio is high.

For the case where the same original (same f(x)) was used to generate the two images, as in image acquisition methods of two sets of sensors at different depth or two scans with a single set of sensors, Δh is known and Eq. (10) can be used to estimate h. When the image acquisition method is used, i.e. similar images in a calibration step, it can be assumed that the calibration image has a similar Fourier magnitude spectrum as the scanned image when they are both in focus. In this case, h is known from the placement of the calibration image and Δh can be determined from Eq. (10).

Figure 3:
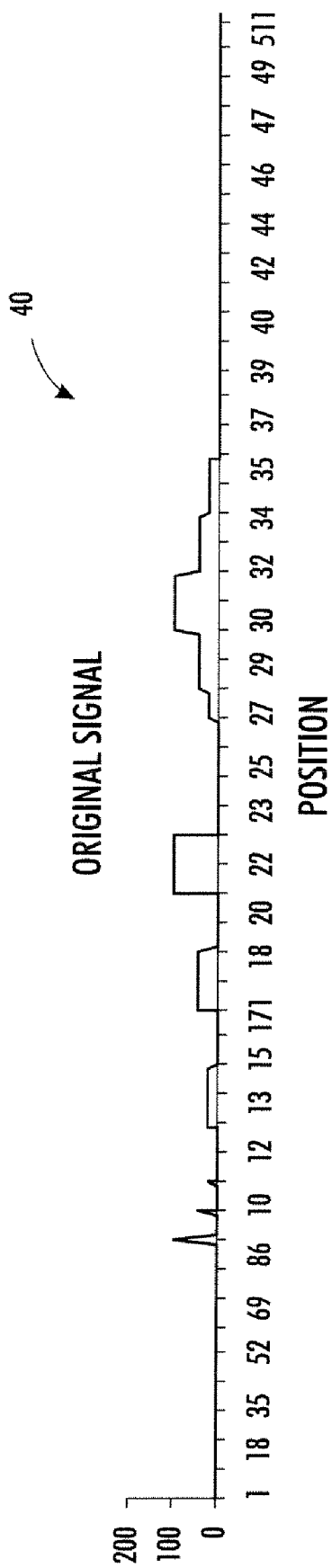
FIG. 3 is a graph of an original signal.
Figure 4:
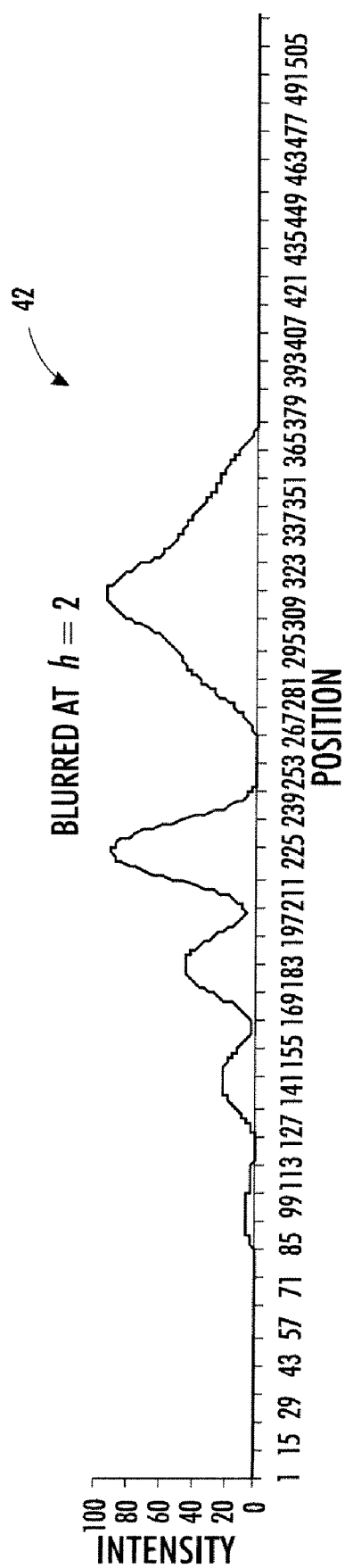
FIG. 4 is a graph of a blurred signal obtained at h=2 (i.e. an unknown quantity)
Figure 5:
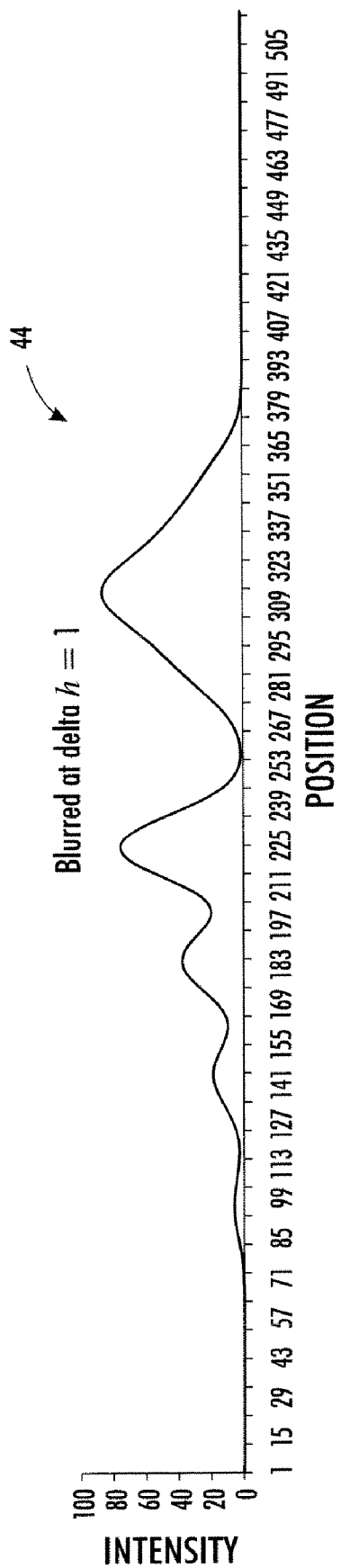
FIG. 5 is a graph of a blurred signal obtained at Δh=1 (i.e. a known quantity)
Figure 6:
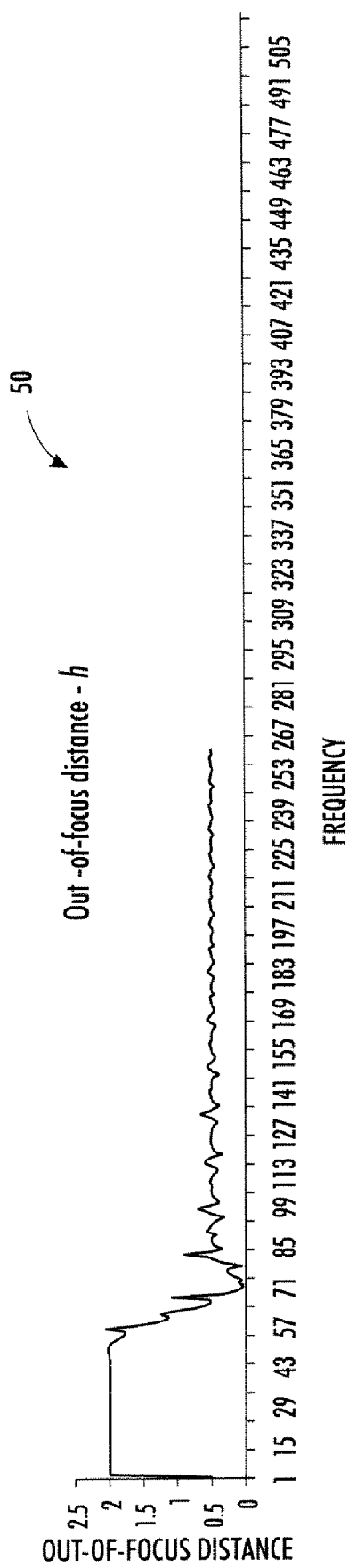
FIG. 6 is a graph of an estimate of the out-of-focus distance h calculated using the Fourier transformations of two scanned images.

A one dimensional (1D) example of depth estimation is provided in FIGS. 3-5. The figures show the original 40 and the simulated two blurred signals 42, 44 obtained at two different depths having defocus distances h=2 and Δh=1, respectively, where $\sigma_0$=3 (in a 600 dpi scanner, h=2 corresponds to the out-of-focus distance ~4 mm). FIG. 6 displays the estimated h 50 using Eq. (10).

As shown in FIG. 6, h calculated from Eq. (10) is constant or nearly constant for the frequency range where $G_1(\xi)$ and $G_2(\xi)$ possess adequate information. Hence, a good estimate of h may be taken from this low frequency region. Even though Equation (10) is derived in the absence of noise, the process is robust even in the presence of significant amount of noise.

Figure 7:
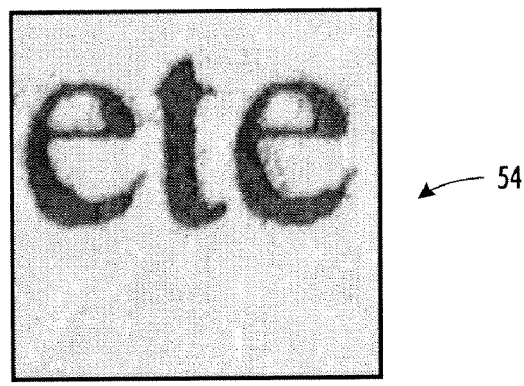
FIG. 7 is a display of an original image.
Figure 8:
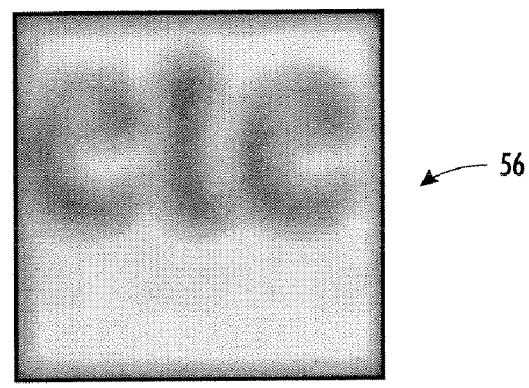
FIG. 8 is a display of a blurred image obtained at h=2 (i.e. unknown)
Figure 9:
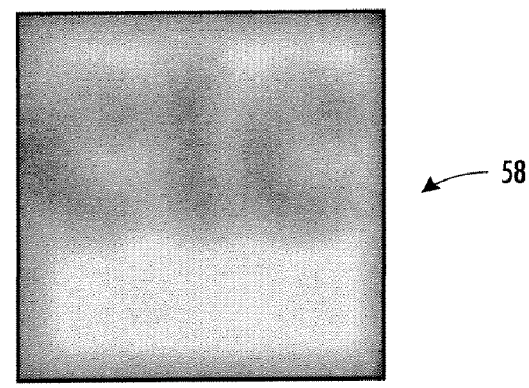
FIG. 9 is a display of a blurred image obtained at Δh=1 (i.e. known)
Figure 10:
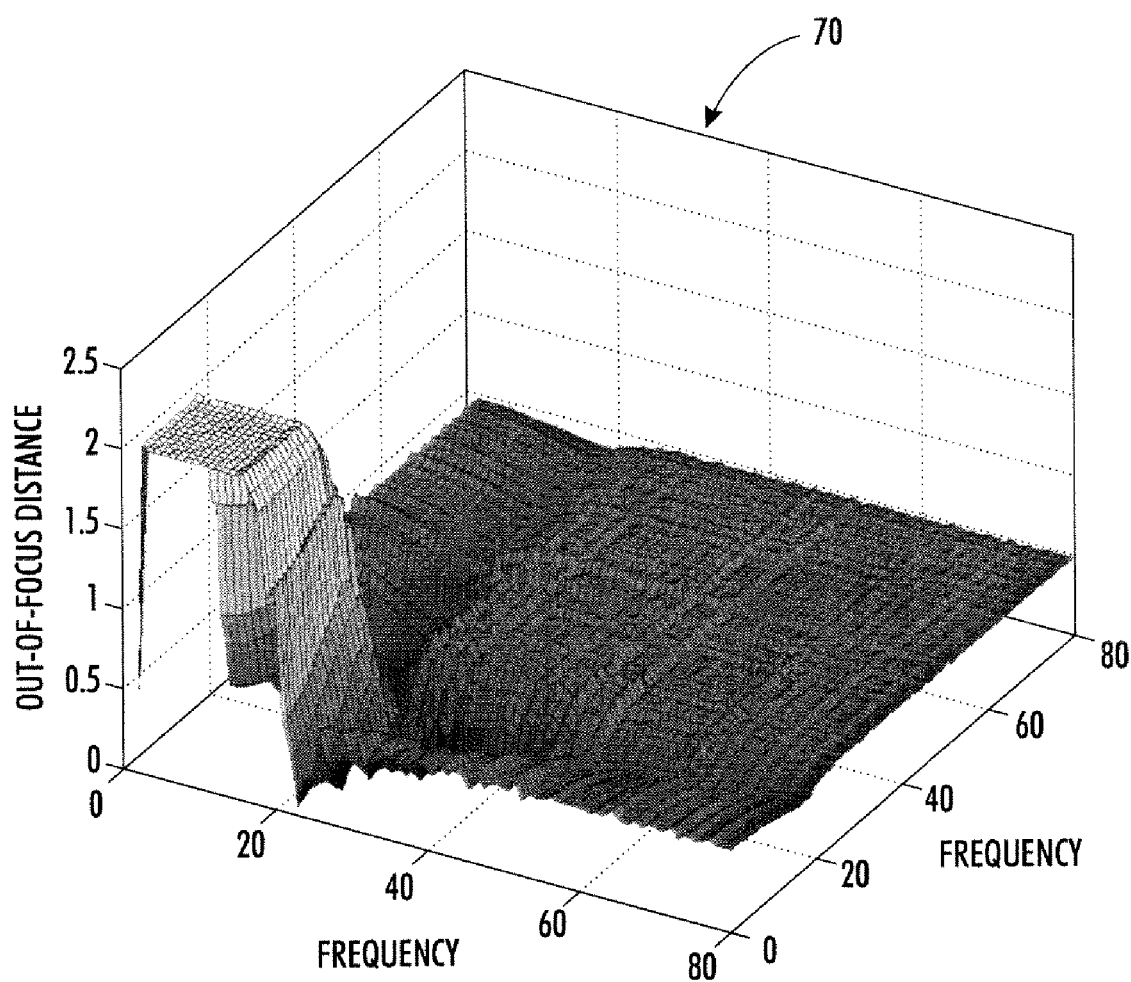
FIG. 10 is an out-of-focus distance h estimated using the Fourier transformations of two scanned images.

In another example, i.e. two-dimensional (2D) case, FIG. 7 shows the original 54 and FIGS. 8 and 9 show two simulated scanned images 56, 58 obtained at two different depths h=2 and Δh=1, respectively. FIG. 10 gives the calculated out-of-focus distance 70 using Eq. (10). Similar to the 1D case, h is estimated from the low frequency region where $G_1(\xi)$ and $G_2(\xi)$ possess adequate information.

Determining out-of-focus distance in a book scanning setting involves determining how defocus varies in one direction within an image when scanning a bound book. The distance h can be determined from columns of pixels that are parallel to the book binding because they all possess the same blur. There are several ways to determine the set of h values from individual pixel column h values. For example, an h can be determined for each column and used directly for subsequent restoration. Another approach would be to determine h values for multiple columns of pixels and fit those values to a smooth function. Simple smoothing can be performed on the h values, but more accurate results can be obtained by using knowledge of the shape of the curved page.

Once the out-of-focus distance h is known, one can use h to design the deblurring filters. In this application, various deblurring techniques can be used, such as the inverse filtering technique shown by Eq. (11), to restore the scanned images 26.

$$F(\xi)=G_1(\xi)/B(\xi;h) \quad (11)$$

Figure 11:
FIG. 11 is a restored image of FIG. 5 by the use of an inverse filtering technique; and, FIG. 12 is a restored image of FIG. 9 by the use of an inverse filtering technique.
Figure 12:
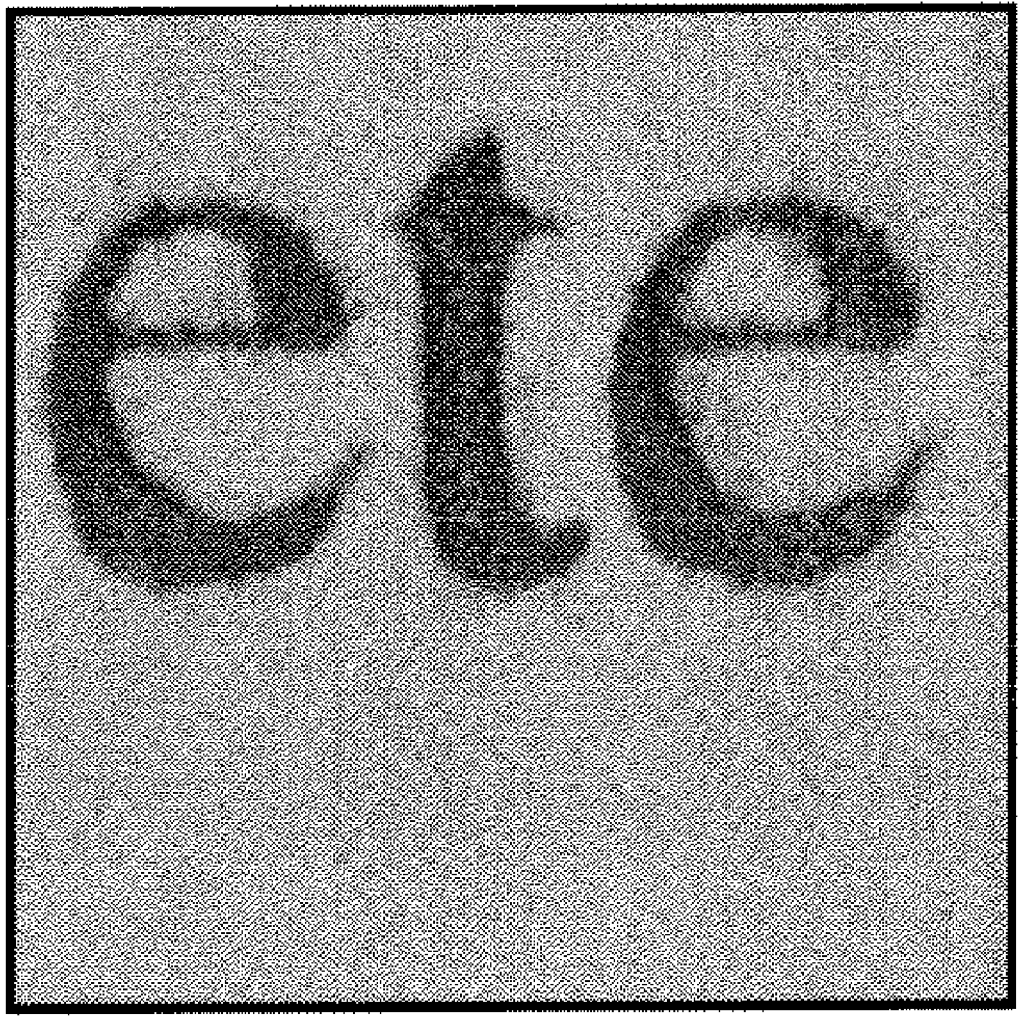

FIGS. 11 and 12 show the restoration of the signal in FIG. 4 and image in FIG. 8, respectively.

In the presence of noise, restoration techniques, such as Wiener filtering, can be used to avoid potential noise amplification in the deblurring process. By using more advanced restoration techniques and the second scanned image, it is also possible not only to compensate for the blurring effect in the scanned images, but also to enhance the scanned image by reducing noise. For example, in the absence of noise, using Eq. (11) or Eq. (12) as given by $$F(\xi)=G_2(\xi)/B(\xi;h+\Delta h), \quad (12)$$

will yield the same estimation of $F(\xi)$. However, in the presence of noise, the two estimated $F(\xi)$'s are different from each other. Therefore, a noise reduction scheme can be given by $$F(\xi)=wF_1(\xi)+(1-w)F_2(\xi), \quad (13)$$

where w is a weighting factor, which can be selected based on the scanner noise properties.

The restoration method shown above can be directly applied when the blurring effect is uniform across the image field. However, when this out-of-focus distance varies across an image as in a scan of a bound book, this analysis must be performed on a local basis. The use of windows or spatially varying operators can be employed for this setting. For instance, instead of using the direct Fourier transform, one can use methods, such as spatially varying convolution, windowed Fourier transform (WFT), or the wavelet transform.

Additional processing may be performed to compensate for the geometric distortion and illumination fall-off. For instance, methods found in, for example, U.S. Pat. No. 6,806,980 can be used to correct the non-uniform illumination, and methods in, for example, U.S. Pat. No. 7,170,644 can be used to correct the geometric distortion 28 (as discussed above). Other methods found in the patent literature or scientific literature may also be used for these additional restoration operations.

In addition to the illustrated image restoration application of this disclosure and the described scanned book application, three dimensional (3D) profiles of other shallow objects can potentially be accurately estimated. That is, the 3D estimation capability of the described method can be generally applied to defocused scanning and scanning 3D objects given the two or more scans contain sufficient different information content.

Practical book scanning may make use of several depth estimators because factors such as image content, noise, or the scanning apparatus may render one method more effective than another method. Or, it may be advantageous to combine results from various methods in a way that weighs the results of a given method by relative confidence in the method. In some cases a page edge may not be well defined in the image or illumination fall-off might not be suitable for prediction for colored pages.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method of determining local defocus distance in a scanned image of a non-planar original object, said method comprising:
    scanning at least a portion of the non-planar original object to produce first scanned image data at a first focal plane;
    scanning same said at least a portion of the non-planar original object to produce at least second scanned image data at a second focal plane;
    said first scanned image data is different from said second scanned image data wherein a distance between said first focal plane and said second focal plane is a predetermined quantity;

estimating an out-of-focus distance of said object from said first and said second scanned image data; and, wherein estimating of said out-of-focus distance of said object includes a ratio of Fourier transform widths of said first and said second scanned image data.

2. The method as set forth in claim 1, wherein said out-of-focus distance is calculated from the Fourier transformations of said first and second scanned image data wherein said first scanned image data includes an unknown blurred position and said second scanned image data includes a known blurred position relative to said first scanned image data.

3. A method of determining local defocus distance in a scanned image of a non-planar original object, said method comprising:

scanning at least a portion of the non-planar original object to produce first scanned image data at a first focal plane;

scanning same said at least a portion of the non-planar original object to produce at least second scanned image data at a second focal plane;

said first scanned image data is different from said second scanned image data wherein a distance between said first focal plane and said second focal plane is a predetermined quantity;

estimating an out-of-focus distance of said object from said first and said second scanned image data;

a first set of sensors is positioned at a first depth such that said first focal plane is at a platen surface;

a second set of sensors is positioned at a second depth such that said second focal plane is offset from said first set of sensors; and, said first scanned image data and said second scanned image data are simultaneous.

4. A method of determining local defocus distance in a scanned image of a non-planar original object, said method comprising:

scanning at least a portion of the non-planar original object to produce first scanned image data at a first focal plane;

scanning same said at least a portion of the non-planar original object to produce at least second scanned image data at a second focal plane;

said first scanned image data is different from said second scanned image data wherein a distance between said first focal plane and said second focal plane is a predetermined quantity;

estimating an out-of-focus distance of said object from said first and said second scanned image data;

a set of sensors is positioned at a first depth for said first scanned image data;

said set of sensors is positioned at a second depth for said second scanned image data; and, said first depth is said first focal plane and said second depth is said second focal plane.

5. The method as set forth in claim 4, wherein said non-planar object is an open book having a book binding.

6. A method of determining local defocus distance in a scanned image of a non-planar original object, said method comprising:

scanning at least a portion of the non-planar original object to produce first scanned image data at a first focal plane;

scanning same said at least a portion of the non-planar original object to produce at least second scanned image data at a second focal plane;

said first scanned image data is different from said second scanned image data wherein a distance between said first focal plane and said second focal plane is a predetermined quantity;

estimating an out-of-focus distance of said object from said first and said second scanned image data;

a first set of sensors is positioned at a first depth at said first focal plane; and, changing an optical-object-to-sensor distance of said first set of sensors while maintaining said position of said first set of sensors.

7. A method of determining local defocus distance in a scanned image of a non-planar original object, said method comprising:

scanning at least a portion of the non-planar original object to produce first scanned image data at a first focal plane;

scanning same said at least a portion of the non-planar original object to produce at least second scanned image data at a second focal plane;

said first scanned image data is different from said second scanned image data wherein a distance between said first focal plane and said second focal plane is a predetermined quantity;

estimating an out-of-focus distance of said object from said first and said second scanned image data;

a first set of sensors is positioned at a first depth at said first focal plane;

said first set of sensors is positioned at a second depth at a second focal plane; and, changing an optical-object-to-sensor distance of said first set of sensors while changing said position of said first set of sensors from said first depth to said second depth.

8. A digital imaging method for imaging an open book having a book binding, said method comprising:

scanning the open book including a non-planar original object to produce first scanned image data at a first focal plane;

scanning the open book including same said non-planar original object to produce at least second scanned image data at a second focal plane;

said first scanned image data is different from said second scanned image data wherein a distance between said first focal plane and said second focal plane is a predetermined quantity;

estimating an out-of-focus distance of said object from said first and said second scanned image data;

determining local defocus distances at a plurality of pixel columns parallel to the book binding, said defocus distance being determined from at least one image feature obtainable from said first scanned image data and said second scanned image data;

restoring said first and/or said second scanned image data by deblurring said image data using inverse filtering;

a first set of sensors is positioned at a first depth such that said first focal plane is at a platen surface;

a second set of sensors is positioned at a second depth such that said second focal plane is offset from said first set of sensors; and, said first scanned image data and said second scanned image data are simultaneous.

9. A printing apparatus for reproducing an image representation of a non-planar object, said apparatus comprising:

a planar imaging platen;

a scanner for scanning said non-planar object placed on the platen to produce a first scanned image at a first focal plane and a second scanned image at a second focal plane;

said first and said second scanned image data containing at least one of geometric distortions, blurring defects and illumination variations;

said first scanned image data is different from said second scanned image data wherein a distance between said first focal plane and said second focal plane is a predetermined quantity;

a processor for calculating an out-of-focus distance of said object from said first and said second scanned image data;

an image processor for determining local defocus distances at a plurality of pixel columns, said defocus distance being determined from at least one image feature obtainable from one of said first scanned image data and said second scanned image data;

a digital processing station for restoring said first and said second scanned image data by deblurring said image data using said local defocus distances;

printing said deblurred image data;

a first set of sensors is positioned at a first depth such that said first focal plane is at a platen surface;

a second set of sensors is positioned at a second depth such that said second focal plane is offset from said first set of sensors; and, said first scanned image data and said second scanned image data are simultaneous.

10. A printing apparatus for reproducing an image representation of a non-planar object, said apparatus comprising:

a planar imaging platen;

a scanner for scanning said non-planar object placed on the platen to produce a first scanned image at a first focal plane and a second scanned image at a second focal plane;

said first and said second scanned image data containing at least one of geometric distortions, blurring defects and illumination variations;

said first scanned image data is different from said second scanned image data wherein a distance between said first focal plane and said second focal plane is a predetermined quantity;

a processor for calculating an out-of-focus distance of said object from said first and said second scanned image data;

an image processor for determining local defocus distances at a plurality of pixel columns, said defocus distance being determined from at least one image feature obtainable from one of said first scanned image data and said second scanned image data;

a digital processing station for restoring said first and said second scanned image data by deblurring said image data using said local defocus distances;

printing said deblurred image data;

a set of sensors is positioned at a first depth for said first scanned image data; and, said set of sensors is positioned at a second depth for said second scanned image data.

11. The apparatus as set forth in claim 10, wherein said non-planar object is an open book having a book binding.

12. A printing apparatus for reproducing an image representation of a non-planar object, said apparatus comprising:

a planar imaging platen;

a scanner for scanning said non-planar object placed on the platen to produce a first scanned image at a first focal plane and a second scanned image at a second focal plane;

said first and said second scanned image data containing at least one of geometric distortions, blurring defects and illumination variations;

said first scanned image data is different from said second scanned image data wherein a distance between said first focal plane and said second focal plane is a predetermined quantity;

a processor for calculating an out-of-focus distance of said object from said first and said second scanned image data;

an image processor for determining local defocus distances at a plurality of pixel columns, said defocus distance being determined from at least one image feature obtainable from one of said first scanned image data and said second scanned image data;

a digital processing station for restoring said first and said second scanned image data by deblurring said image data using said local defocus distances;

printing said deblurred image data;

a first set of sensors is positioned at a first depth at said first focal plane; and, a second set of sensors is positioned at a second depth at said second focal plane offset from said first focal plane.

13. A printing apparatus for reproducing an image representation of a non-planar object, said apparatus comprising:

a planar imaging platen;

a scanner for scanning said non-planar object placed on the platen to produce a first scanned image at a first focal plane and a second scanned image at a second focal plane;

said first and said second scanned image data containing at least one of geometric distortions, blurring defects and illumination variations;

said first scanned image data is different from said second scanned image data wherein a distance between said first focal plane and said second focal plane is a predetermined quantity;

a processor for calculating an out-of-focus distance of said object from said first and said second scanned image data;

an image processor for determining local defocus distances at a plurality of pixel columns, said defocus distance being determined from at least one image feature obtainable from one of said first scanned image data and said second scanned image data;

a digital processing station for restoring said first and said second scanned image data by deblurring said image data using said local defocus distances;

printing said deblurred image data; and, wherein said processor for calculating an out-of-focus distance of said object includes Fourier transform widths of said first and said second scanned image data.

* * * * *